(12) United States Patent
Graham et al.

(10) Patent No.: US 7,527,037 B2
(45) Date of Patent: May 5, 2009

(54) COMPONENT FOR FUEL SUPPLY

(75) Inventors: Andrew C Graham, Coventry (GB); Allan J Salt, Nuneaton (GB); Gary Eadon, Hinckley (GB); Ian J Toon, Whetstone (GB)

(73) Assignee: Rolls-Royce plc, London (GB)

( * ) Notice: Subject to any disclaimer, the term of this patent is extended or adjusted under 35 U.S.C. 154(b) by 77 days.

(21) Appl. No.: 11/717,678

(22) Filed: Mar. 14, 2007

(65) Prior Publication Data
US 2008/0029068 A1 Feb. 7, 2008

(30) Foreign Application Priority Data
Mar. 17, 2006 (GB) ................................. 0605432.4

(51) Int. Cl.
  *F02M 61/14* (2006.01)
  *F02C 1/00* (2006.01)
(52) U.S. Cl. ......................................... 123/470; 60/740
(58) Field of Classification Search ................. 123/468, 123/469, 470; 60/740, 798; 285/98, 118, 285/123.12, 123.14
See application file for complete search history.

(56) References Cited

U.S. PATENT DOCUMENTS

| | | | |
|---|---|---|---|
| 3,159,971 A * | 12/1964 | Moebius et al. ............... | 60/740 |
| 4,441,323 A * | 4/1984 | Colley ......................... | 60/737 |
| 4,467,610 A * | 8/1984 | Pearson et al. ................ | 60/739 |
| 4,655,912 A * | 4/1987 | Bradley et al. .............. | 210/133 |
| 5,417,054 A * | 5/1995 | Lee et al. .................... | 60/39.94 |
| 5,771,696 A | 6/1998 | Hansel et al. | |
| 6,354,085 B1 | 3/2002 | Howell et al. | |
| 7,356,994 B2 * | 4/2008 | Bleeker ....................... | 60/798 |
| 7,370,477 B2 * | 5/2008 | Roche et al. .................. | 60/761 |
| 2005/0223709 A1 | 10/2005 | Bleeker | |

FOREIGN PATENT DOCUMENTS

EP  0 724 115 A  3/1998

* cited by examiner

*Primary Examiner*—Thomas N Moulis
(74) *Attorney, Agent, or Firm*—W. Warren Taltavull; Manelli Denison Selter PLLC

(57) ABSTRACT

A joint for a gas turbine fuel injector, the joint comprises a housing for supporting a fuel injector, a first tube terminating within the housing and a second tube. The housing at least partially encloses an adaptor having a bore, with one end of the first tube and one end of the second tube being located within opposing ends of the bore. First sealing means are provided between the outside of the first tube and the adaptor bore, second sealing means are provided between the outside of the second tube and the adaptor bore and third sealing means are provided between the outside of the adaptor and the housing. The joint is particularly suitable for conduits carrying a relatively cold fluid mounted in a relatively hot housing.

15 Claims, 2 Drawing Sheets

COMPONENT FOR FUEL SUPPLY

FIELD OF THE INVENTION

This invention concerns a joint and particularly a joint between a first tube and a second tube, and even more particularly a joint between a first and second tube that carries a relatively cold fluid and which is located in a relatively hot housing, such a joint has application as a fuel injector assembly in the fuel injector of a gas turbine engine.

BACKGROUND OF THE INVENTION

Gas turbine engines have combustion chambers within which fuel is burnt to heat a working fluid. The temperature within a combustor can be as high as 1900 K. Fuel is supplied through fuel injectors that are specifically designed to withstand high temperatures and effectively atomise the fuel.

In some fuel injectors, particularly those that are known as "dual fuel" injectors, the fuel injector requires an internal fuel tube that isolates a first form of fuel from a second form of fuel. The first form of fuel is typically a liquid and the second form of fuel is typically a gas, though both may be liquids or gasses of the same or differing composition depending on the design and required energy output from the gas turbine.

The fuel injectors have significant temperature variations in operation. At start up the temperature can be close to ambient whilst at operating conditions where power produced by the engine is at a maximum the temperature can be in excess of 1000K. Thermal expansion of the tubes and the injector housing create stresses within the components that can cause fatigue and damage to the tube or housing. The stresses are exacerbated by the temperature difference between the relatively cold fuel in the tubes and the relatively hot housing. The fuel remains at a relatively constant temperature that is approximately equal to the fuel inlet temperature and remains within approximately 30 degrees Celsius at the point of injection regardless of the power output of the engine.

In a known injector, described with reference to FIG. 1 the injector housing comprises two pieces 102,106 jointed by a weld joint. The first piece 102 comprises the injector stalk 104 that leads to the injector head (not shown). The second piece 106 incorporates the connector 108 into which the injector fuel tube 110 fits and also comprises a port 112 into which an engine fuel tube is inserted.

Fuel is supplied to the injector head from the engine fuel tube (not shown) inserted into the top port 112 of the housing. The fuel flows through a weight type distributor 116 positioned in the second piece of the housing and into the fuel tube 110.

The connector 108 is angled such that its axis 122 is aligned with the expansion axis of the fuel pipe 110. Leakage of fuel is prevented by providing dynamic seals between the connector 108 and the fuel tube 110. The seals allow limited relative movement between the two components caused by operational temperature differences of the relatively cool fuel pipe 110 and the relatively hot housing 102, 106.

The housing is assembled by placing the second housing piece over the first housing piece such that the connector engages and seals with the injector fuel tube. Because the connector 108 is provided at an angle to the main axis 120 of the second component it is not possible to rotate the first piece of the housing 102 relative to the second piece 106. Consequently, the two housing pieces 102,106 are then secured together by a weld joint. The joint creates a fluid tight chamber 114 isolated from the internal liquid fuel passage and into which, in operation, a gaseous fuel may be supplied and fed to the injector head.

A weld joint offers a number of advantages: it is light and has high integrity. Failure of an internal seal therefore does not result in an overboard leak as the leaking fuel is retained within the housing and fed by the inner tubes to the combustor.

The weld joint is considered to be permanent as it can only be broken by cutting the joint and then reforming the weld. Consequently, it is expensive and time consuming to inspect and replace any of the internal seals. Additionally, the weld joint requires an internal braze the quality of which it is difficult to assess. It is difficult to heat treat the weld between the two housing pieces without damaging the inner seals.

It is an object of the present invention to seek to provide an improved injector assembly that addresses these and other problems.

SUMMARY OF THE INVENTION

According to the present invention there is provided a gas turbine fuel injector having: a housing for supporting a fuel injector head; a fuel tube within the housing for supplying fuel to the injector head; and an adaptor at least partially enclosed by the housing and having a bore into one end of which an end of the fuel tube is enclosed; wherein first sealing means are provided between the outside of the fuel tube and the adaptor bore; and characterised in that second sealing means are provided between the outside of the adaptor and the housing.

Preferably the adaptor is rotatable within the housing, preferably the axis of thermal expansion of the fuel tube is concentric with the axis of the adaptor bore.

The first sealing means may be a dynamic seal. The dynamic seal may be a dynamic "O" ring.

Preferably the housing comprises a securing portion with an axis concentric with the axis of the adaptor bore. The second sealing means may be provided between the outside of the adaptor and the securing portion of the housing.

The second sealing means may comprise an "O" ring and may further comprises a metal to metal seal between the housing and the adaptor.

Preferably the adaptor has a fuel conduit enclosed by the opposing end of the bore to the end having the fuel tube. Preferably third sealing means are provided between the outside of the fuel conduit and the adaptor bore.

The fuel injector may comprise securing means at least partially enclosing the fuel conduit and at least partially enclosing the housing for securing the fuel conduit to the housing.

Preferably the securing means is rotatable around the axis of the securing portion. Alternatively, the securing means may be adapted to clip against the securing portion. The securing means may be retained on the fuel conduit.

Preferably the fuel tube is contained within a cavity in the housing, the housing further comprising an inlet port for a second fuel, wherein the inlet port opens into the cavity for the supply of the second fuel thereto.

BRIEF DESCRIPTION OF THE DRAWINGS

An embodiment of the present invention will now be described by way of example only and with reference to the accompanying drawings, in which:—

DETAILED DESCRIPTION OF THE INVENTION

Figure 1:
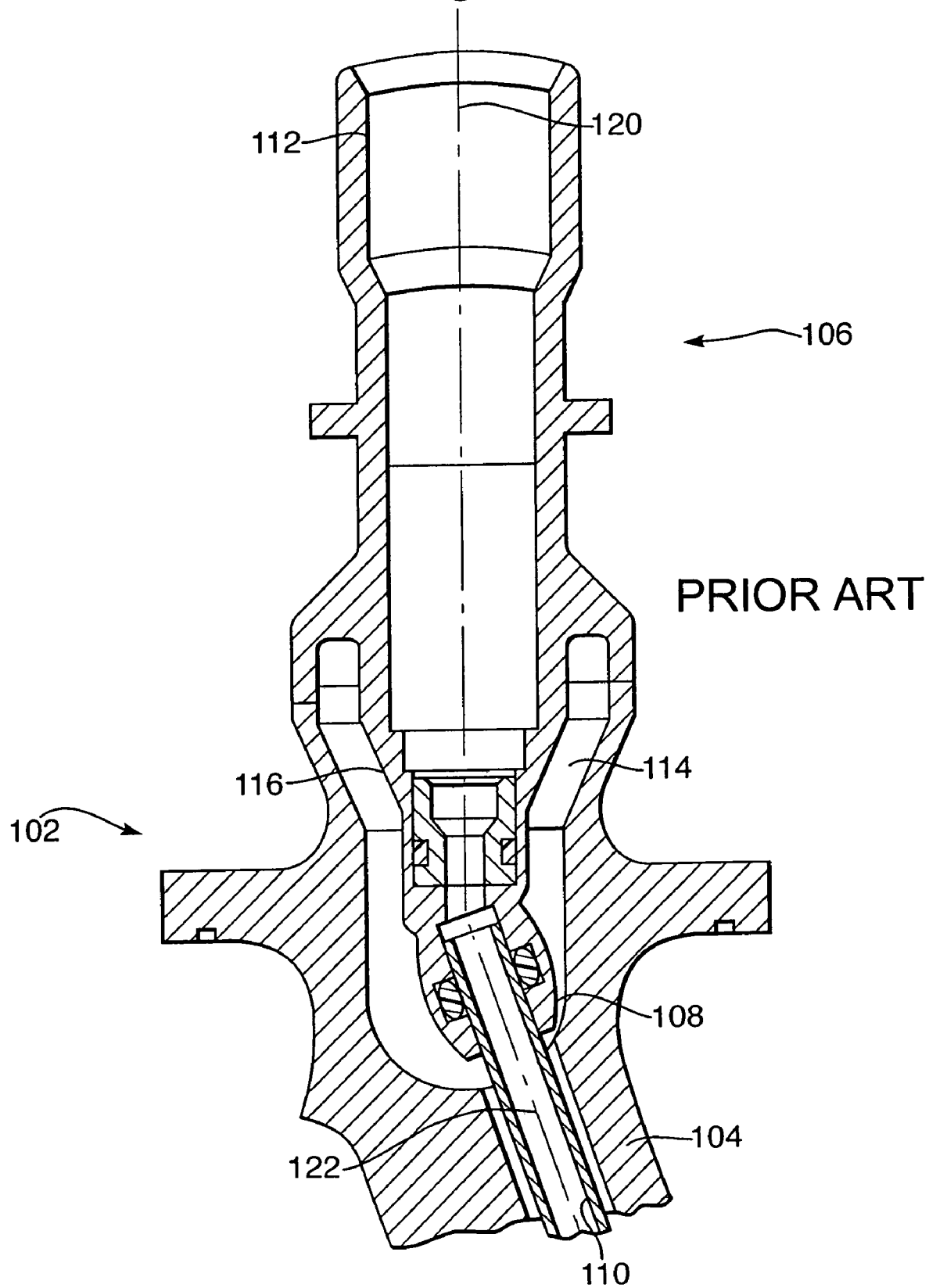
FIG. 1 depicts a prior art fuel injector for a gas turbine engine.
Figure 2:
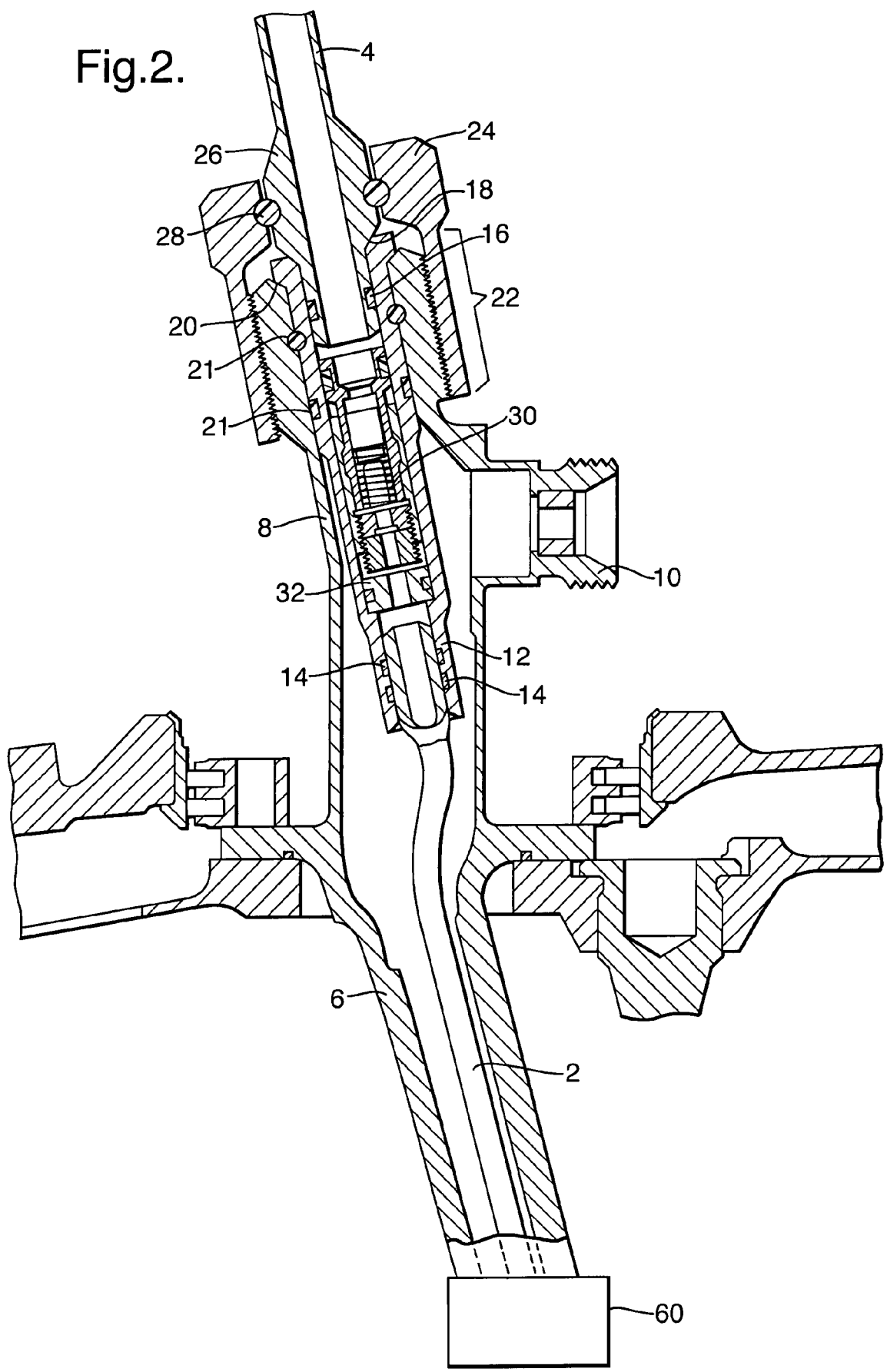
FIG. 2 depicts a joint for a gas turbine fuel injector in accordance with the invention.

The joint depicted in FIG. 2 joins a fuel tube 2 with a fuel conduit 4. The fuel tube 2 supplies a liquid fuel to a fuel injector head (60) supported by the fuel injector stalk 6. The stalk is hollow and is adapted to supply a gaseous fuel to the fuel injector head, the gaseous fuel being supplied externally of the fuel tube 2.

Depending on the power required by the engine or the fuel available it is possible to vary the quantity of liquid or gaseous fuel supplied to the injector head. The gaseous fuel is supplied to the injector stalk via a port 10 located at the top end of the injector housing 8.

A gas turbine combustor typically operates at temperatures around 1700 K. Even at the inlet to the combustor, where the fuel injectors are typically located, the temperature of the air external of the injector housing is close to that of the air leaving the compressor i.e. 650 to 880 K. The fuel, supplied by the fuel conduit 4 and through the fuel tube 2, is typically around ambient and this disparity generates expansion of the components due to thermal effects and can cause excessive stress build-up leading to an early failure of the components.

To alleviate the problems caused by the temperature difference between the cold fuel and manifold tube 2,4 and the hot housing 6,8 the manifold tube and the fuel tube are connected through an adaptor 12. The adaptor 12 is essentially a hollow tube with a bore. The fuel tube 2 is inserted into one end of the adaptor and a seal 14 prevent the passage of fluid from the adaptor into the gaseous fuel.

The seal is provided by an "o" ring, or series of "o" rings spaces axially along the bore of the adaptor and mounted in a respective groove. The "o" rings are dynamic in that they allow the fuel tube 2 to move axially within the adaptor 12.

The fuel conduit 4 is inserted into the other end of the adaptor 12 and secured by a seal that consists of a first barrier metal to metal seal 18 and a second barrier "o" ring 16.

The axis of the adaptor 12 is aligned with the expansion axis of the fuel tube 2. Beneficially, this enables the unit to be assembled without the need for complex anti-rotation features on the adaptor 12. Additionally, expansion of the fuel tube 2 relative to the injector housing is enabled, the expansion being such that rocking and potential damage of components, caused by bind-up, is reduced. Additionally, the simple "o" rings can be used to both seal and facilitate the movement induced by thermal expansion and thus avoid excessive stress build up.

The adaptor is inserted inside the fuel injector housing and sealed using a metal to metal seal 20, and two axially spaced "o" rings 21. A portion of the housing 22 is angled to match the angle of the axis of the adaptor 12 to facilitate the joining of the housing, adaptor and fuel conduit.

A nut 24 mounted to the fuel conduit 4 secures the conduit and thus the adaptor 12 to the fuel injector housing 8. The fuel conduit 4 has a reinforced portion 26 to provide strength at the point where the nut is attached. A retaining wire 28 serves to locate the nut on the manifold tube.

The reinforced portion 26 is shaped such that it combined with the top inner portion of the adaptor 12 to provide a metal to metal seal 18.

The construction of the joint provides a number of advantages. For example, it will be appreciated that the described embodiment enables field repair and inspection of the internal aspects of the fuel injector joint by undoing the nut.

Similarly, the construction offers double seals on all the fluid joints. The double seals reduce the likelihood of any fluid leakages. Where the seals are "o" rings these can be installed after any welding/heat treatment operations have been performed on the body, and may further be replaced in the field.

Beneficially, the construction provides a secure joint with reduced vibration as the flexibility of the fuel tube need not be high. The angle of the fuel tube expansion can be matched to the angle of the adaptor and the angle of manifold tube can similarly be matched to that of the adaptor. The concentricity of the three components can be maintained.

As a further advantage the adaptor may be provided with a integral weight type distributor 30 and/or trimmer 32. A trimmer allows wider manufacturing tolerances to be corrected during a final test procedure. As the joint is now easier to disassemble and check it is possible for the joint to be disassembled in the field. Such disassembly would, in practice, make it possible for an inexperienced fitter to reassemble the injector with an incorrect trimmer component. This should be avoided and by making the trimmer integral with the adaptor the possibility for such an error is minimised.

Gauze 32, or some other securing means, retains the weight type distributor 30 in the adaptor, which ensures a balanced flow of liquid fuel between multiple fuel injectors within the engine.

Various modifications may be made without departing from the scope of the invention.

For example, the described joint may be used in other industries other than fuel injectors in a gas turbine engine. This is particularly the case where the joint is between a first and second tube carrying a relatively cold fluid in a relatively hot housing.

The joint arrangement may also be used, with minor modification, in fields such as the chemical or biomedical industries where the double seals provide security against the egress of potentially harmful materials.

Another form of securing mechanism may be used to secure the manifold tube with the fuel injector housing than the enlarged nut described above. The mechanism should preferably be semi-permanent in that it can be broken and re-formed without damage to the fuel injector housing. For example, the securing mechanism may be a clamp or a flanged joint to name but two.

The invention claimed is:

1. A gas turbine fuel injector assembly having:
   a housing for supporting a fuel injector head;
   a fuel tube within the housing for supplying fuel to the injector head; and
   an adaptor at least partially enclosed by the housing and having a bore with an axis into one end of which an end of the fuel tube is enclosed;
   first sealing means being provided between the outside of the fuel tube and the adaptor bore wherein said first sealing means is yieldable to thermal expansion of said fuel tube and said housing in order to allow said fuel tube to move relative to said axis within said adaptor bore; and
   second sealing means being provided between the outside of the adaptor and the housing.

2. A fuel injector assembly according to claim 1, wherein the adaptor is rotatable within the housing.

3. A fuel injector assembly according to claim 1, wherein the axis of thermal expansion of the fuel tube is concentric with the axis of the adaptor bore.

4. A fuel injector assembly according to claim 1, wherein the dynamic seal is a dynamic "O" ring.

5. A fuel injector assembly according to claim 1, wherein the housing comprises a securing portion with an axis concentric with the axis of the adaptor bore.

6. A fuel injector assembly according to claim 5, wherein the second sealing means is provided between the outside of the adaptor and the securing portion of the housing.

7. A fuel injector assembly according to claim 1, wherein the second sealing means comprises an "O" ring.

8. A fuel injector assembly according to claim 7, wherein the second sealing means further comprises a metal to metal seal between the housing and the adaptor.

9. A fuel injector assembly according to claim 1, wherein the adaptor has a fuel conduit enclosed by the opposing end of the bore to that end having the fuel tube.

10. A fuel injector assembly according to claim 9, wherein third sealing means are provided between the outside of the fuel conduit and the adaptor bore.

11. A fuel injector assembly according to claim 9, comprising securing means at least partially enclosing the fuel conduit and at least partially enclosing the housing for securing the fuel conduit to the housing.

12. A fuel injector assembly according to claim 11, wherein the securing means is rotatable around the axis of the securing portion.

13. A fuel injector assembly according to claim 11, wherein the securing means is adapted to clip against the securing portion.

14. A fuel injector assembly according to claim 11, wherein the securing means is retained on the fuel conduit.

15. A fuel injector assembly according to claim 1, wherein the fuel tube lies within a cavity in the housing, the housing further comprising an inlet port for a second fuel, wherein the inlet port opens into the cavity for the supply of the second fuel thereto.

\* \* \* \* \*